(12) United States Patent  (10) Patent No.: US 7,775,541 B2
Linger et al.  (45) Date of Patent: Aug. 17, 2010

(54) HITCH ADAPTER FOR TOWING A FIFTH WHEEL TRAILER

(75) Inventors: Don Frederick Linger, Stockton, CA (US); Donald Herbert Kahrs, Valley Springs, CA (US)

(73) Assignee: GRLC, LLC, Madison Heights, MI (US)

( * ) Notice: Subject to any disclaimer, the term of this patent is extended or adjusted under 35 U.S.C. 154(b) by 185 days.

(21) Appl. No.: 11/864,174

(22) Filed: Sep. 28, 2007

(65) Prior Publication Data

US 2009/0085326 A1 Apr. 2, 2009

(51) Int. Cl.
*B62D 53/08* (2006.01)
(52) U.S. Cl. .................................... 280/433; 280/441.2
(58) Field of Classification Search ................ 280/433, 280/441.2
See application file for complete search history.

(56) References Cited

U.S. PATENT DOCUMENTS

| | | | | |
|---|---|---|---|---|
| 4,960,288 A | * | 10/1990 | Chambers | ................. 280/423.1 |
| 5,016,898 A | | 5/1991 | Works | |
| 5,240,270 A | | 8/1993 | Colibert | |
| 5,277,448 A | | 1/1994 | Colibert | |
| 5,529,329 A | * | 6/1996 | McCoy | ..................... 280/438.1 |
| 5,707,070 A | * | 1/1998 | Lindenman et al. | ........ 280/438.1 |
| 5,725,234 A | | 3/1998 | Colibert | |
| 5,772,229 A | * | 6/1998 | Cattau | ..................... 280/438.1 |
| 5,839,745 A | * | 11/1998 | Cattau et al. | ................. 280/434 |
| 6,024,372 A | | 2/2000 | Colibert | |
| 6,158,761 A | * | 12/2000 | King | .......................... 280/495 |
| 6,170,850 B1 | | 1/2001 | Works | |
| 6,357,777 B1 | * | 3/2002 | Linger et al. | ................. 280/441 |
| 6,386,570 B2 | | 5/2002 | Linger | |
| 6,467,791 B1 | * | 10/2002 | Fandrich et al. | .......... 280/491.5 |
| 6,502,846 B2 | * | 1/2003 | Fandrich et al. | .......... 280/491.5 |
| 6,520,528 B2 | | 2/2003 | Fandrich | |
| 2005/0082787 A1 | * | 4/2005 | Dick | ........................ 280/415.1 |

OTHER PUBLICATIONS

International Search Report; PCT/US08/77945; issued May 22, 2009.
Office Action, CA2,604,746, issued Oct. 15, 2009.

* cited by examiner

*Primary Examiner*—Tony H. Winner
(74) *Attorney, Agent, or Firm*—Novak Druce + Quigg LLP

(57) ABSTRACT

A wheeled vehicle including a platform portion having a mounting bracket for coupling a fifth wheel hitch to the vehicle. A pair of elongate frame members are located beneath the platform portion, and each having a lengthwise axis oriented substantially parallel to a forward direction of travel of the vehicle. A brace frame beneath the platform that is coupled between the pair of elongate frame members. The mounting bracket is secured to the brace frame and includes a stabilizer including a pair of elongate support arms joined by a cross-member. An anchor arrangement fixes the bracket relative the platform with long axes of the pair of arms transverse to the forward direction of travel. The mounting bracket has a lower portion in abutting engagement with the platform portion of the vehicle and an upper portion configured for receiving fixed coupled engagement of a fifth wheel hitch.

21 Claims, 5 Drawing Sheets

HITCH ADAPTER FOR TOWING A FIFTH WHEEL TRAILER

FIELD

This disclosure relates generally to a trailer hitch adapter, and particularly to a trailer hitch mounted to a towing vehicle.

BACKGROUND

The towing of trailers or other vehicles behind a towing vehicle requires that a hitch be provided on the towing vehicle that is compatible with a mating connector on the trailer or otherwise towed vehicle. While hitch connections between towing and towed vehicles have been standardized to a large extent, several general types of trailer hitches have emerged.

When an operator wishes to purchase a new trailer or tow one that is different from the vehicles they regularly tow, he or she must consider whether it is even possible to tow the proposed trailer with their existing vehicle. This analysis typically involves determining load ratings, towing vehicle power, and towed vehicle connections such as hitches, brakes, and lights. Many operators own towed vehicles that require the use of two or more different types of hitches thereon. The common types of hitches include a ball hitch, a fifth-wheel hitch, and gooseneck hitches. For heavy towed vehicles, the fifth-wheel and gooseneck hitches are the most commonly used.

Additionally, the towing vehicle might be used for purposes besides towing the towed vehicle(s), such as a pick-up truck where the bed of the pick-up truck is also used to haul equipment and other goods. In these circumstances, the presence of a hitch in the bed of the pick-up truck would limit the usability of the cargo space.

Thus, it is desirable to provide a hitch assembly that allows for towing a number of trailers or other wheeled vehicles having at least two different hitch types, and without adding additional obstacles to the bed of the towing vehicle.

SUMMARY

In at least one exemplary embodiment, a mounting bracket for coupling a fifth wheel hitch to a bed of a wheeled vehicle is presented. The vehicle bed has a lengthwise axis oriented substantially parallel to a forward direction of travel of the vehicle and a widthwise axis oriented substantially perpendicular to the forward direction of travel of the vehicle. The mounting bracket includes a stabilizer which includes a pair of elongate support arms coupled together by a cross-member that maintains respective long axes of the pair of elongate support arms in substantial parallel orientation. The mounting bracket further includes an anchor arrangement that couples the mounting bracket in a vehicle bed with respective long axes of the pair of elongate support arms oriented transverse to a lengthwise axis of the vehicle bed.

When the anchor arrangement couples the mounting bracket in the vehicle bed, the respective long axes of the pair of elongate support arms are oriented substantially perpendicular to the lengthwise axis of the vehicle bed. In at least one embodiment, the long axes of the pair of elongate support arms are each oriented substantially perpendicular to the cross-member. In this configuration, the mounting bracket has an H-shape top-plan view in a bed-installed orientation. The legs of the H-shaped mounting bracket include the pair of elongate support arms and the respective long axes of the pair of elongate support arms which are oriented substantially perpendicular to the lengthwise axis of the vehicle bed in the bed installed orientation.

The anchor arrangement can further include a releasable fastener that has an upper portion that engages the mounting bracket and a lower portion that releasably engages a brace frame located below the vehicle bed. In at least one embodiment, the releasable fastener is threaded for screwed engagement with the brace frame located below the vehicle bed and the upper portion of the releasable fastener comprises a head portion that abuts the mounting bracket in a secured orientation. In yet another embodiment, a receiving aperture through the cross-member can be provided and the receiving aperture is bounded by a receiving surface that abuttingly receives the head portion of the releasable fastener in the secured orientation. In at least one embodiment, the receiving aperture is geometrically centered relative a top plan view of the mounting bracket in the bed installed orientation. The releasable fastener can further include a releasable sleeve formed at a bottom distal end thereof in the secured orientation. The head portion of the releasable fastener can further include a non-round exterior periphery and the mounting bracket can further include a wrench having an opening comprising a non-round interior periphery mating engaged with the head portion. The wrench can include an extension arm that has a locked configuration when the releasable fastener is in the secured orientation.

In yet another embodiment, a wheeled vehicle having a platform portion that includes a mounting bracket for coupling a fifth wheel hitch to a vehicle is disclosed. The mounting bracket can be one of the embodiments as described above. The vehicle includes a pair of elongate frame members beneath the platform portion and each of the elongate frame members have a lengthwise axis oriented substantially parallel to a forward direction of travel of the vehicle. Furthermore, a brace frame beneath the platform portion and coupled between the pair of elongate frame members. The brace frame has a lengthwise axis oriented substantially perpendicular to the forward direction of travel of the vehicle.

In at least one embodiment, the wheeled vehicle includes a bed floor that is fixably mounted to the elongate frame members. The distal ends of the elongate support arms are positioned substantially above the elongate frame members and a gap is present between the bed floor and elongate frame members. In order to provide additional support beneath the distal ends of the elongate support arms, load bearing support brackets can be located substantially beneath the distal ends of the elongate support arms.

Various additional aspects and advantages of this disclosure will become apparent to those skilled in the art from the following detailed description.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

Figure 1:
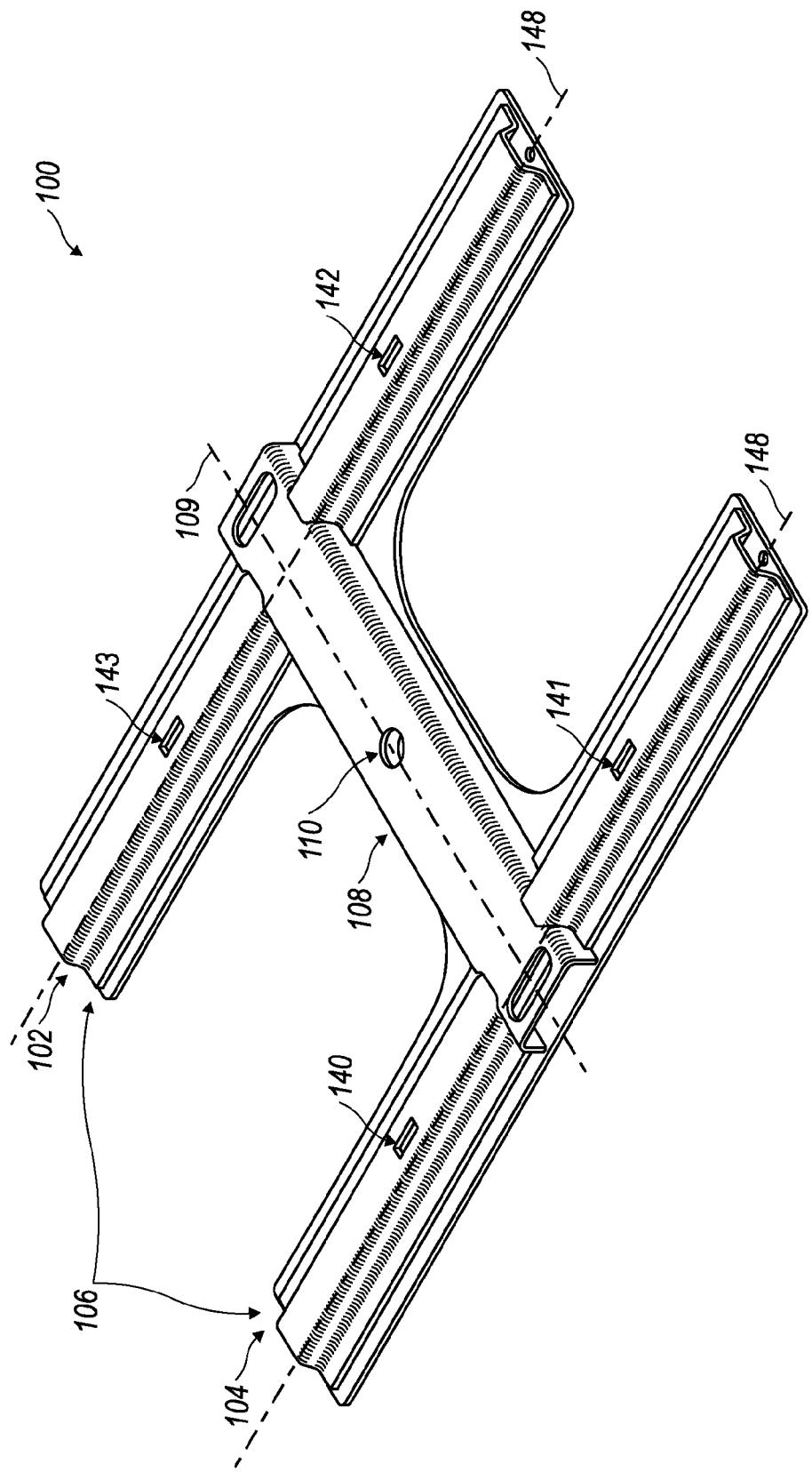
FIG. 1 is a topside perspective view of a mounting bracket for coupling a fifth wheel hitch to a bed of a wheeled vehicle.
Figure 2:
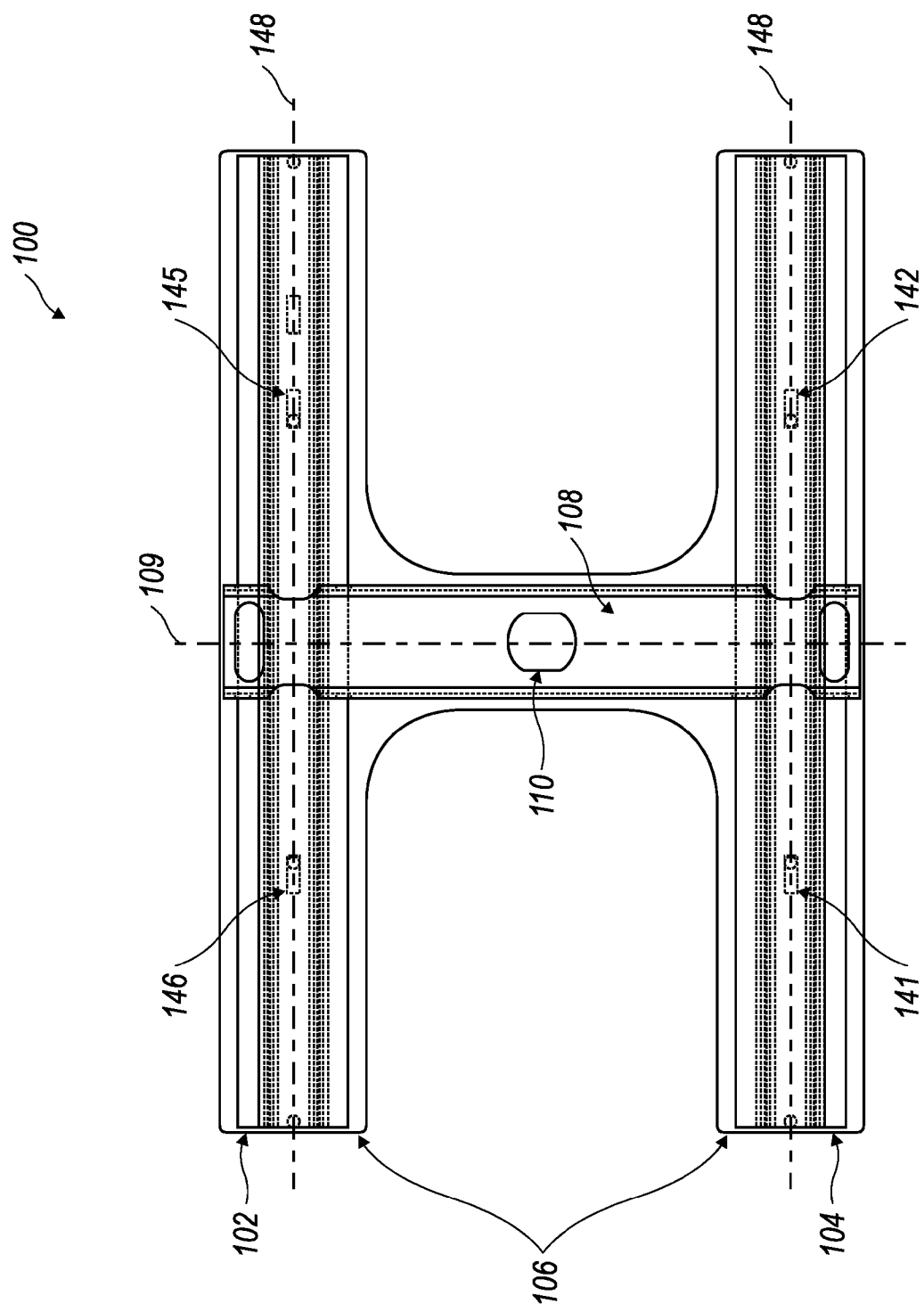
FIG. 2 is a top plan view of the mounting bracket of FIG. 1.

Referring to FIG. 1, a stabilizer 100 includes, but is not limited to a pair of elongate support arms 106 coupled together by a cross-member 108. The cross-member 108 maintains the respective long axes of the pair of elongate support arms 148 in a substantially parallel orientation.

Figure 3:
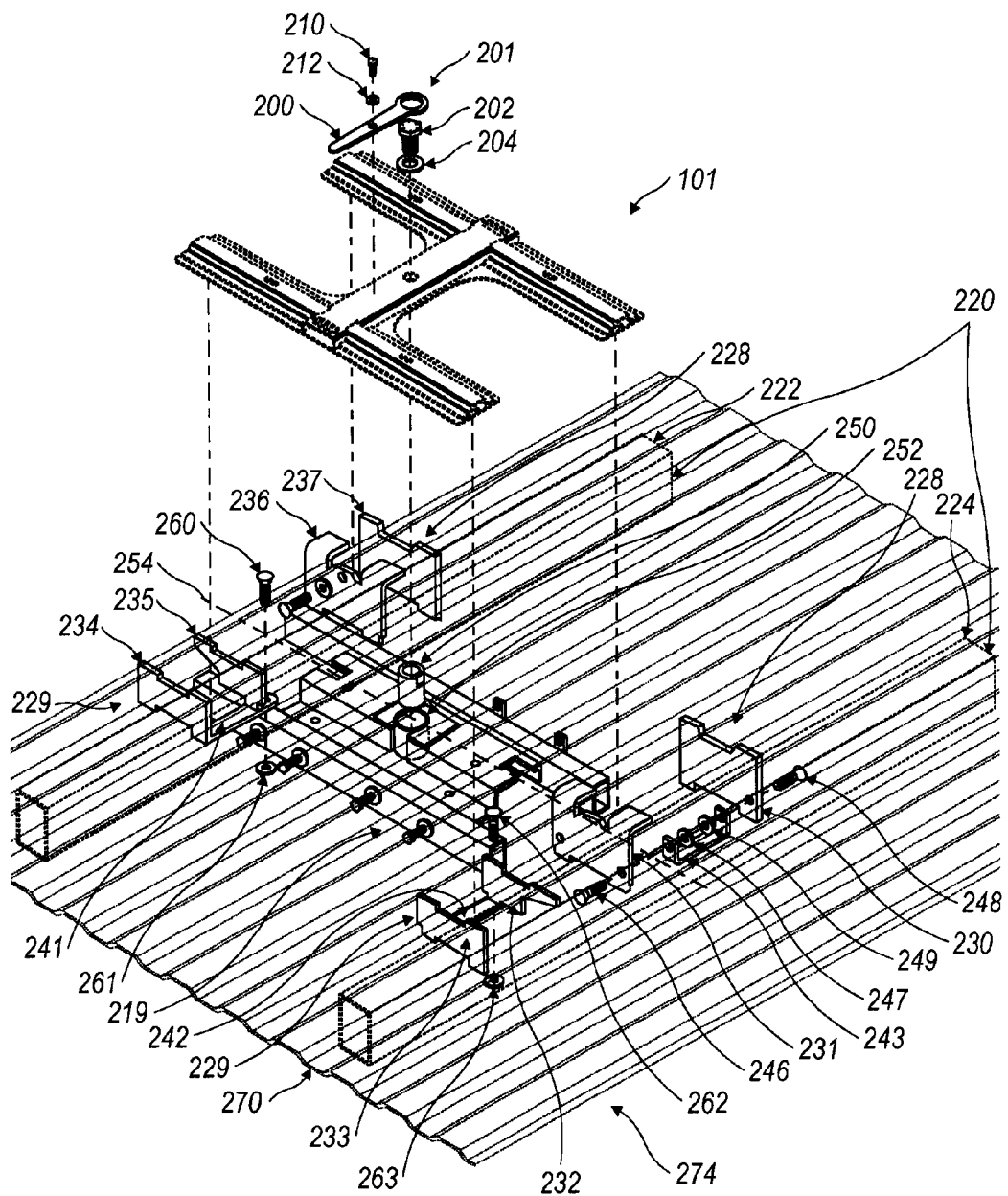
FIG. 3 is an exploded assembly view of the mounting bracket and an anchor arrangement for detachably connecting the mounting bracket to a pair of elongate frame members.
Figure 5:
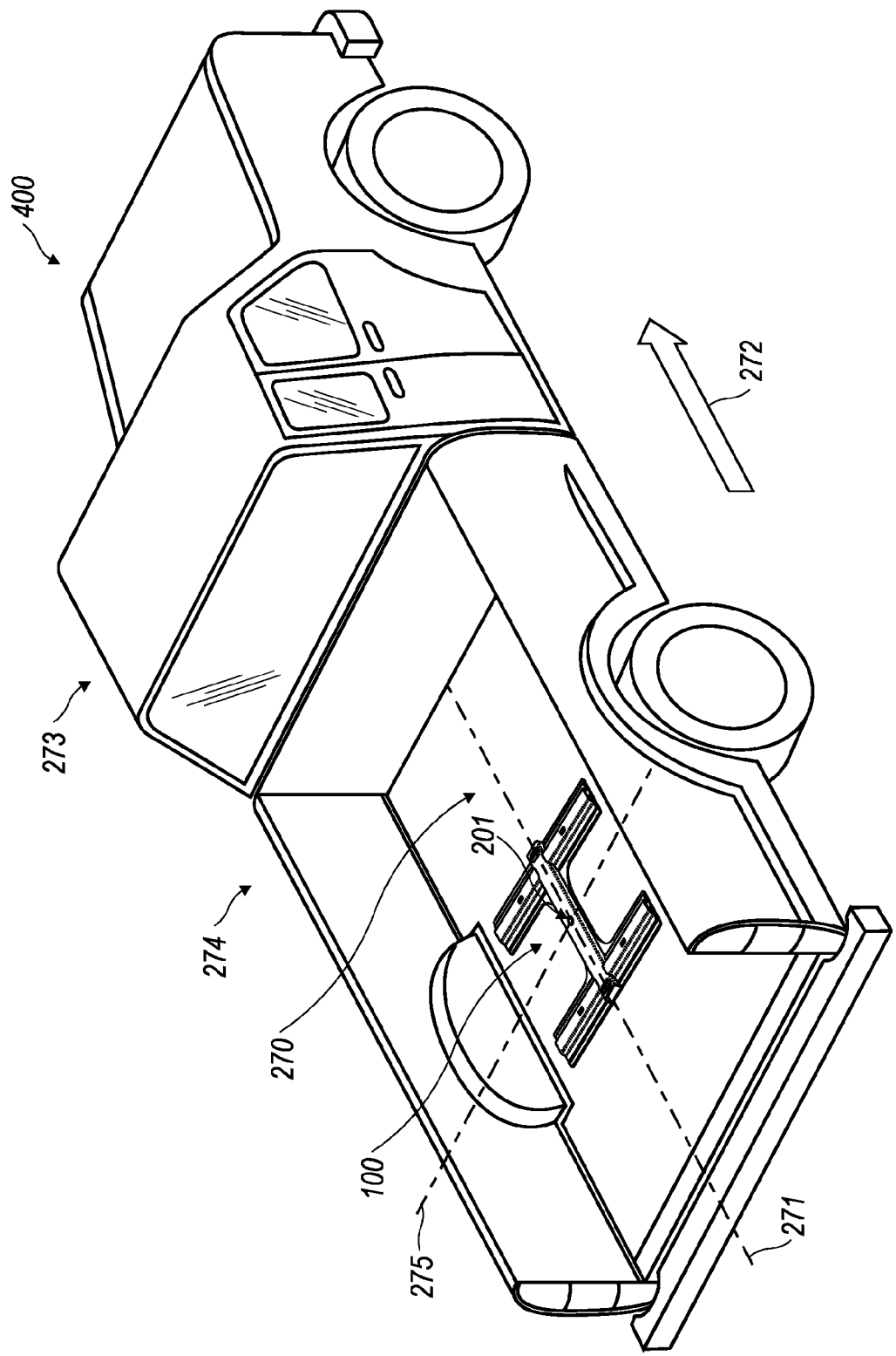
FIG. 5 is a topside perspective view of the mounting bracket mounted in a towing vehicle.

The mounting bracket 101 is installed in the vehicle bed 274. As illustrated in FIGS. 3 and 5, an anchor arrangement 201 couples the mounting bracket 101 to the vehicle frame 220. In FIG. 5, the respective long axes 148 of the pair of elongate support arms 106 are oriented transverse to a lengthwise axis 271 of the vehicle bed 274. The lengthwise axis 271 of the vehicle bed 274 is oriented substantially parallel to a forward direction of travel 272 of the vehicle. The widthwise axis 275 of the vehicle bed 274 is oriented substantially perpendicular to the forward direction of travel 272 of the vehicle. The forward direction of travel 272 refers to a directional line that is substantially parallel to a long axis of the so-traveling vehicle. Typically, and as shown, the vehicle includes a cab 273 that faces the direction of travel as shown in FIG. 5.

Figure 4:
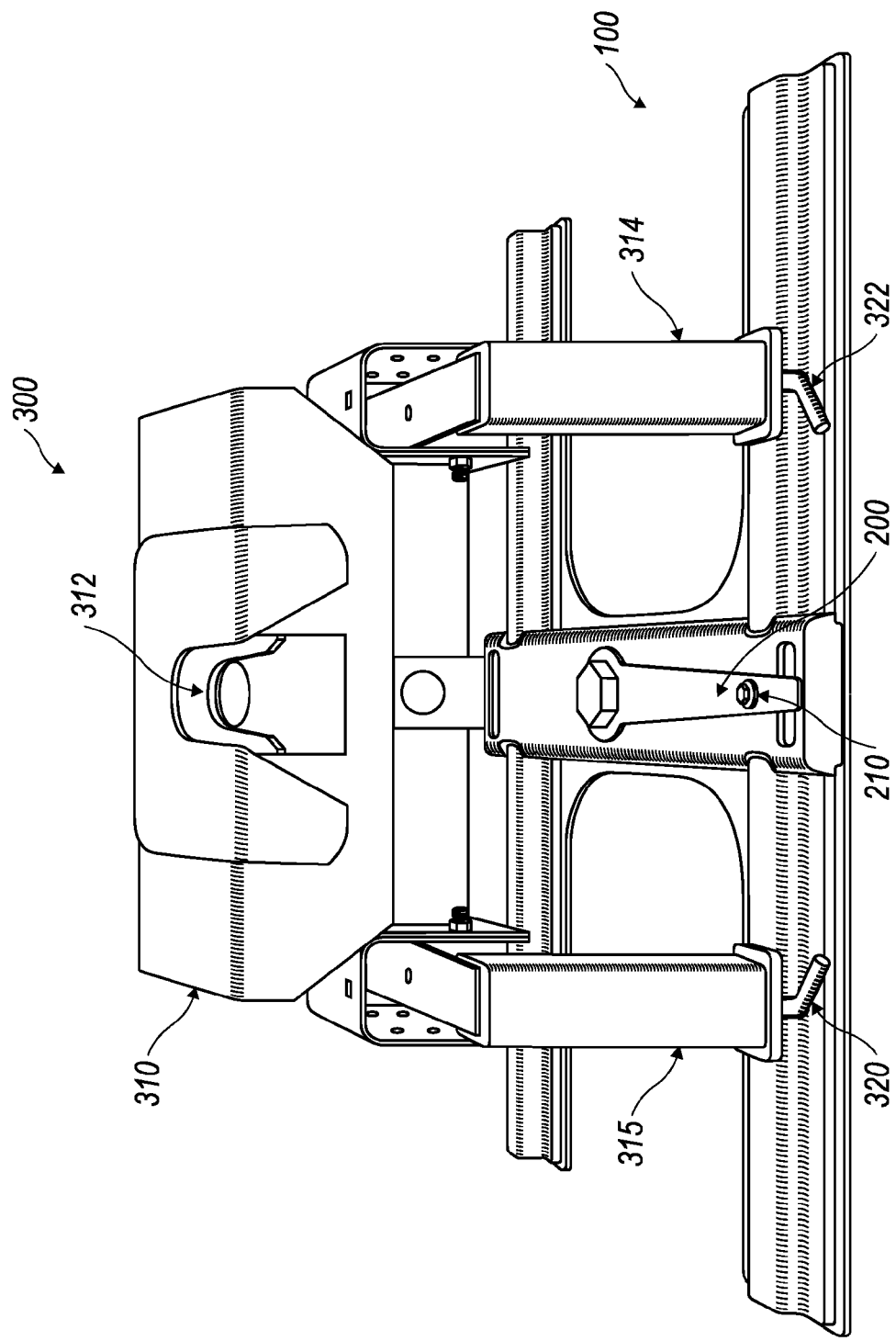
FIG. 4 is a backside, perspective view of a fifth wheel hitch head connected to a mounting bracket.

The mounting bracket 101 has a lower portion configured for abutting engagement with the vehicle bed 274, as illustrated in FIG. 3, and an upper portion configured for receiving fixed coupled engagement of a fifth wheel hitch 300, as shown in FIG. 4. The fifth wheel hitch 300 in part comprises (includes, but is not necessarily limited to) a fifth wheel hitch head 310 that is designed to engage a king pin on a trailer equipped to connect with a receiving portion 312 of the fifth wheel hitch head 310. Furthermore, the mounting bracket 101 can be configured to releasably engage a brace frame 219 located below the vehicle bed 274. A releasable fastener 202 has an upper portion that engages the mounting bracket 101 and a lower portion that releasably engages the brace frame 219. An example of a releasable fastener is a bolt as illustrated in at least FIG. 3. The bolt has a head portion which is the upper portion for engagement of the mounting bracket 101. In at least one embodiment, a washer 204 can be situated between the head portion and the upper portion of the mounting bracket 101. The lower portion of the bolt is threaded for screwing engagement with the brace frame 219. When in a secured orientation, the head portion of the bolt snuggly abuts the mounting bracket 101 and the threaded portion is engaged with the brace frame 219.

In one embodiment, the receiving aperture 110 is located in a position that is substantially centered between the front and back elongate support arms 102, 104. In at least one embodiment the receiving aperture 110 is through the cross-member 108 and is bounded by a receiving surface that abuttingly receives the head portion of the releasable fastener 202 in the secured orientation. The location of the receiving aperture 110 is such that it can be located substantially in the geometric center of the mounting bracket 101 in the bed installed position. Other positions that are not centered with respect to the mounting bracket 101 or the pair of elongate support arms 106 is contemplated by this disclosure. For instance, the receiving aperture 110 can be located closer to the front elongate support arm 102 or back elongate support arm 104 without departing from the scope of this disclosure.

Additionally, while the releasable fastener 202 has been described herein as a piece that is separate from the mounting bracket 101, it is contemplated that the releasable fastener 202 can be made as a part of the mounting bracket 101. While not shown in the figures, the fastener could be one such that a bolt is retained with the mounting bracket 101. Furthermore, the releasable fastener 202, while illustrated as a bolt, could be other types of fasteners that can releasably engage such as clip engageable fastener, scissor clamp, or the like. When equipped with these other types of fasteners, adaptation of the mounting bracket 101 is required to accommodate these changes and those having ordinary skill in the art will appreciate the necessary changes that would be required for such adaptation.

Returning to the situation where the releasable fastener 202 is threaded for screwing or screwed engagement, a releasable sleeve 250 is formed at a bottom distal end of the releasable fastener 202 in the secured orientation. The releasable sleeve 250 can be a separate portion from the mounting bracket 101 and installable within the brace frame 219. Furthermore, the releasable fastener 202 can have a non-round (exemplarily, polygonal) exterior periphery, and a wrench 200 with a corresponding non-round interior to matingly engage with the head portion of the releasable fastener 202 can be provided. In one embodiment, the wrench 200 is provided with the mounting bracket 101 at the time of sale. Thus, the purchaser is not required to have a special tool to remove the mounting bracket 101 beyond that which is provided.

However, when the mounting bracket 101 is provided with a wrench 200 that enables the operator to remove the mounting bracket 101 from its secured orientation, theft or other unauthorized manipulation may occur. In order to prevent such unauthorized adjustment, the extension arm of the wrench 200 can have a locked configuration when the releasable fastener 202 is in the secured orientation to prevent unauthorized disengagement of the mounting bracket 101 from the vehicle 400. In at least one embodiment, a securing bolt 210 is used to lock the extension arm of the wrench 200 in the locked configuration. A locking washer 212 can be positioned between the securing bolt 210 head to assist in holding the securing bolt in substantial registration with the wrench 200. While a securing bolt 210 is shown in FIG. 3, another locking device can be implemented such as a lock mechanism equipped to operate with a key.

The anchor arrangement 201 of the mounting bracket 101 couples the mounting bracket 101 in the vehicle bed 274. The coupling of the mounting bracket 101 to the vehicle bed 274, can be accomplished in one of the ways described herein or other such way that one of ordinary skill in the art would appreciate from the disclosure provided herein. The elongate support arms 106 of the mounting bracket 101 are oriented substantially perpendicular to the lengthwise axis 271 of the vehicle bed, when the anchor arrangement 201 couples the mounting bracket 101 in the vehicle bed 274. At least one embodiment of the mounting bracket 101 has an H-shape in a top-plan view thereof when in a bed-installed orientation or configuration as depicted in FIG. 5. In this orientation, the long axes of the pair of elongate support arms 148 are each oriented substantially perpendicular to a long axis of the cross-member 109. In at least one embodiment, the pair of elongate support arms 106 and the respective long axes of the elongate support arms 148 are oriented substantially perpendicular to the lengthwise axis of the vehicle bed 271 in the installed orientation.

When the mounting bracket 101 is in the installed orientation, it can engage the brace frame 219 that support the mounting bracket 101 and distribute the load from the mounting bracket 101 to the vehicle frame 220 which comprises a left elongate frame member 222 and a right elongate frame member 224. The lengthwise axis 254 of the brace frame 219 can be oriented substantially perpendicular to the forward direction of travel 272 of the vehicle. In at least one embodiment, the brace frame 219 is associated with a gooseneck hitch (not shown). The gooseneck hitch (not shown) can be adapted to allow the operator to selectively locate the mounting bracket 101 or a ball (not shown) within the receiving socket 252. When the brace frame 219 is equipped with the removable ball, the vehicle bed 274 is left substantially unobstructed. In some installations U-bolts or other mounting mechanisms might penetrate the vehicle bed 274. The ball hitch may require the use of a locking pin (not shown) to release the engagement of the ball from the brace frame 219. Once removed, the receiving socket 252 in the brace frame 219 is adaptable.

In order to install the mounting bracket 101 in the vehicle bed 274, the ball of the gooseneck hitch is removed. Then, the operator inserts a releasable sleeve 250 into the ball receiving portion of the gooseneck hitch and secures the releasable sleeve 250 using the same or similar method as required to secure the ball to the gooseneck hitch. The releasable sleeve 250 is further configured for receipt of the releasable fastener 202. When the releasable fastener 202 is threaded, the releasable sleeve 250 is threaded as well for receipt and engagement of the threads on the releasable fastener 202.

The mounting bracket 101 can be equipped with a removable fifth wheel hitch 300, comprising in part a first and second fifth wheel hitch support member 314, 315 to support the engagement surface. The first and second fifth wheel hitch support members 314, 315 are then connected to the elongate support arms 106 of the mounting bracket 101. The ends of the first and second fifth wheel hitch support members 314, 315 that are designed for connection with the elongate support arms 106 having insertable engagement members for connection with horizontal mounting slots 140-143. When the first and second fifth wheel hitch support members 314, 315 are placed in connection with the aforementioned horizontal mounting slots 140-143, the fifth wheel hitch 300 is removably connected to the elongate support arms 106. When the fifth wheel hitch 300 is removable from the elongate support arms 106 as described above, the operator can more easily install and connect the fifth wheel hitch 300 to the vehicle 400.

While the mounting bracket 101 is designed to withstand normal loading conditions experienced by the towing vehicle 400, in some circumstances additional support of the vehicle bed 274 may be required. The additional support for the vehicle bed 274 may be needed in instances where a rapid start or stop is required. In these situations the ends of the elongate support arms 106 may cause deformation of the vehicle bed floor 270. This can occur because of the concentrated loading experienced at the ends of the elongate support arms 106 under these loading conditions. Other loading conditions might likewise cause damage to the vehicle bed floor 270 without proper support. As may be appreciated from FIG. 4, with a gooseneck trailer coupled (hitched) to the fifth wheel hitch 300 at its head 310, abrupt stops and starts will cause leveraged forces to be applied to the stabilizer 100 which must be resisted. These forces are primarily resisted at the terminal/distal end of the elongate support arms 102, 104. As may be appreciated from FIG. 5, if the high pressured ends are only supported by the sheet metal of the truck bed deck 274, a punch-through could occur, but at least damage would likely be imparted to the deck 274. In order to avoid this damage and provide sufficient under-support for the deck 274, the brace frame 219 is located in close proximity therebelow.

The punch-through risk described above is due to the fact that a gap or similar spacing is normally present from the original truck manufacturer between the vehicle bed floor 270 and the vehicle frame 220. Therefore, it is desirable to include additional support over the vehicle frame 220 and beneath the vehicle bed floor 270 to give extra support below the stabilizer 100. Typically, the bed of a pickup has a floor, two to four sides and the different parts can be made from corrugated metal, carbon composite, or plastic, among others. These corrugations also provide for additional gaps between the vehicle bed floor 270 and the vehicle frame 220.

As contemplated herein, the mounting bracket 101 is in substantial contact with the vehicle bed floor 270. The underside of the vehicle bed floor 270 can be supported using front load bearing support brackets 228 that are in substantial registration with the vehicle bed floor 270 and vehicle frame 220. The front load bearing support brackets 228 are capable of being installed after the vehicle 400 has been manufactured. This allows an operator of the vehicle 400 to either install the brackets 228 without assistance or have a shop do the installation.

Two different types of front load bearing support brackets 228 are illustrated in FIG. 3. The first type is positioned beneath the front right corner of the front elongate support arm 102. The front right front load bearing support bracket 230 under the front right corner of the front elongate support arm 102 connects via the right front load bearing support connecting bracket 243 to the front right rear load bearing support bracket 231. When these pieces 230 and 231 are connected it provides support to the vehicle bed floor 270 in the region that is substantially near the front right corner of the front elongate support arm 102. The pieces 230 and 231 can be connected by a connecting bracket 243 using bolts 246, 248 and nuts 247, 249. Likewise, similarly shaped front left front load bearing support bracket 237 can be connected to front left rear load bearing support bracket 236 to provide support to the region of the vehicle bed floor 270 that is substantially near the front left corner of the front elongate support arm 102. The front load bearing support brackets 228 are designed to accommodate the shape of the vehicle bed floor 270. When the vehicle bed floor 270 is corrugated such that ridges and valleys are provided on the vehicle bed floor 270, the top portion of the front load bearing support brackets 228 that is in substantial contact with the vehicle bed floor 270 has a shape that is substantially similar to the vehicle bed floor 270.

Additionally back load bearing support brackets 229 can be placed under the back elongate support arm 104. The back left rear load bearing support bracket 234 connects via the left rear load bearing support connecting bracket 241 to the back left front load bearing support bracket 235. The left rear load bearing support connecting bracket be connected utilizing a bolt 260 and nut 261. As illustrated in FIG. 3, the left rear load bearing support connecting bracket 241 extends in a direction that is substantially perpendicular to the back left rear load bearing support bracket 234 when the back left rear load bearing support bracket 234 is in an upright engaged positioned. In the upright engaged position the top of the back left rear load bearing support bracket 234 is in substantial connect with the vehicle bed floor 270. The left end of the back elongate support arm 104 is supported by the adjoined back left rear load bearing support bracket 234 and the back left front load bearing support bracket 235. The back right front load bearing support bracket 232 connects via the right rear load bearing support connecting bracket 242 to the back right front load bearing support bracket 233 in a manner that is similar to the connection of the back left rear load bearing support bracket 234 and the back left front load bearing support bracket 235 and to provide support to the region of the vehicle bed floor 270 that is substantially near the right side of the back elongate support arm 104. The right rear load bearing support connecting bracket be connected utilizing a bolt 262 and nut 263.

The above described front and back load bearing support brackets 228, 229 provide support to the loads as experience at the ends of the elongate support arms 106. This additional support protects the vehicle bed floor 270 from damage. The load exerted from towing on the fifth wheel hitch head 310 is also transferred to the vehicle frame 220 from the brace frame 219 to which the mounting bracket 101 attaches. The brace frame 219 and the vehicle frame 220 are capable of supporting the necessary loads.

This detailed description is set forth only for the purposes of illustrating examples of the presently disclosed device and should not be considered to limit the scope of the patent claims in anyway. Clearly, numerous additions, substitutions, and other modifications can be made to preferred embodiments without departing from the scope of the invention which is defined exclusively by the patent claims.

What is claimed is:

1. A mounting bracket for coupling a fifth wheel hitch to a goose-neck hitch comprising a brace frame having a ball receiving socket therein and the brace frame being positioned beneath a bed of a wheeled vehicle with the ball receiving socket centrally located relative to the bed of the wheeled vehicle and aligned with an access aperture through the bed and wherein the vehicle bed has a lengthwise axis oriented substantially parallel to a forward direction of travel of the vehicle and a widthwise axis oriented substantially perpendicular to the forward direction of travel of the vehicle, said mounting bracket comprising:
  a stabilizer comprising a pair of elongate support arms coupled together by a cross-member that maintains respective long axes of said pair of elongate support arms in substantial parallel orientation;
  an anchor arrangement that couples said mounting bracket in the vehicle bed with respective long axes of said pair of elongate support arms oriented transverse to a lengthwise axis of the vehicle bed, said mounting bracket having a lower portion configured for abutting engagement with the vehicle bed and an upper portion configured for receiving fixed coupled engagement of a fifth wheel hitch head; and
  said anchor arrangement further comprising a releasable fastener having an upper portion that engages said mounting bracket at a geometrically centered receiving aperture and a lower portion that releasably engages the brace frame at the ball receiving socket by extension through the access aperture in the vehicle bed.

2. The mounting bracket as recited in claim 1, wherein said anchor arrangement couples said mounting bracket in the vehicle bed with the respective long axes of said pair of elongate support arms oriented substantially perpendicular to the lengthwise axis of the vehicle bed.

3. The mounting bracket as recited in claim 1, wherein said respective long axes of said pair of elongate support arms are each oriented substantially perpendicular to a long axis of said cross-member.

4. The mounting bracket as recited in claim 3, wherein said mounting bracket has an H-shape top-plan view in a bed installed orientation.

5. The mounting bracket as recited in claim 4, wherein legs of said H-shaped mounting bracket comprise said pair of elongate support arms and the respective long axes of said pair of elongate support arms are oriented substantially perpendicular to the lengthwise axis of the vehicle bed in the bed installed orientation.

6. The mounting bracket as recited in claim 1, wherein said lower portion of said releasable fastener is threaded for screwed engagement with the brace frame located below the vehicle bed and said upper portion of said releasable fastener comprises a head portion that snuggly abuts said mounting bracket in a secured orientation.

7. The mounting bracket as recited in claim 6, wherein said receiving aperture is through said cross-member and bounded by a receiving surface that abuttingly receives said head portion of said releasable fastener in the secured orientation.

8. The mounting bracket as recited in claim 6, wherein said releasable fastener further comprises a releasable sleeve formed at a bottom distal end thereof in the secured orientation.

9. The mounting bracket as recited in claim 6, wherein said head portion of said releasable fastener further comprises a non-round exterior periphery and said mounting bracket further comprising a wrench having an opening comprising a non-round interior periphery matingly engaged with said head portion.

10. A wheeled vehicle comprising:
  a platform portion including a mounting bracket for coupling a fifth wheel hitch to a goose-neck hitch;
  a pair of elongate frame members beneath said platform portion, each of said elongate frame members having a lengthwise axis oriented substantially parallel to a forward direction of travel of the vehicle;
  a brace frame beneath said platform portion and coupled between said pair of elongate frame members, said brace frame having a ball receiving socket and a lengthwise axis oriented substantially perpendicular to the forward direction of travel of the vehicle, wherein said ball receiving socket is centrally located relative to the bed of the wheeled vehicle and aligned with an access aperture through the platform portion; and
  said mounting bracket secured to said brace frame and comprising a stabilizer comprising a pair of elongate support arms coupled together by a cross-member that maintains respective long axes of said pair of elongate support arms in substantial parallel orientation, said mounting bracket further comprising an anchor arrangement fixing said mounting bracket relative the platform portion with respective long axes of said pair of elongate support arms oriented transverse to the forward direction of travel of the vehicle, said mounting bracket having a lower portion in abutting engagement with the platform portion of the vehicle and an upper portion configured for receiving fixed coupled engagement of a fifth wheel hitch; and
  said anchor arrangement further comprising a releasable fastener having an upper portion that engages said mounting bracket at a geometrically centered receiving aperture and a lower portion that releasable engages the brace frame at the ball receiving socket by extension through the access aperture in the platform portion.

11. The wheeled vehicle as recited in claim 10, wherein a predominant portion of said mounting bracket is located above said brace frame.

12. The wheeled vehicle as recited in claim 10, wherein respective end portions of said elongate support arms are each located above an elongate frame member.

13. The wheeled vehicle as recited in claim 10, wherein said anchor arrangement couples said mounting bracket on the platform portion with respective long axes of said pair of elongate support arms oriented substantially perpendicular to the lengthwise axis of the platform portion.

14. The wheeled vehicle as recited in claim 10, wherein said respective long axes of said pair of elongate support arms are each oriented substantially perpendicular to a long axis of said cross-member.

15. The wheeled vehicle as recited in claim 14, wherein said mounting bracket has an H-shape top-plan view in a platform installed configuration.

16. The wheeled vehicle as recited in claim 15, wherein legs of said H-shaped mounting bracket comprise said pair of elongate support arms and the respective long axes of said pair of elongate support arms are oriented substantially perpendicular to the lengthwise axis of the platform portion of the vehicle in the installed configuration.

17. The wheeled vehicle as recited in claim 10, wherein said lower portion of said releasable fastener is threaded for screwed engagement with the brace frame beneath the platform portion and said upper portion of said releasable fastener comprises a head portion that snuggly abuts said mounting bracket in a secured configuration.

18. The wheeled vehicle as recited in claim 17, wherein said receiving aperture is through said cross-member and bounded by a receiving surface that abuttingly receives said head portion of said releasable fastener in the secured configuration.

19. The wheeled vehicle as recited in claim 10, further comprising a bed floor fixedly mounted to said elongate frame members.

20. The wheeled vehicle as recited in claim 19, wherein distal ends of the elongate support arms are positioned substantially above said elongate frame members and a gap space is present between said bed floor and elongate frame members.

21. The wheeled vehicle as recited in claim 20, further comprising load bearing support brackets located substantially beneath said distal ends of the elongate support arms and positioned in the gap space between the bed floor and elongate frame members.

* * * * *